(12) United States Patent
Xing

(10) Patent No.: US 10,469,265 B2
(45) Date of Patent: Nov. 5, 2019

(54) TECHNOLOGIES FOR SECURE INTER-ENCLAVE COMMUNICATIONS

(71) Applicant: Intel Corporation, Santa Clara, CA (US)

(72) Inventor: Bin Xing, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 196 days.

(21) Appl. No.: 15/087,254

(22) Filed: Mar. 31, 2016

(65) Prior Publication Data

US 2017/0288875 A1 Oct. 5, 2017

(51) Int. Cl.
*H04L 9/32* (2006.01)
*G06F 21/72* (2013.01)
*H04L 9/08* (2006.01)

(52) U.S. Cl.
CPC ............ *H04L 9/3242* (2013.01); *G06F 21/72* (2013.01); *H04L 9/0838* (2013.01)

(58) Field of Classification Search
CPC . H04L 9/0861; H04L 9/3242; H04L 2209/24; G06F 21/72
See application file for complete search history.

(56) References Cited

U.S. PATENT DOCUMENTS

| | | | | |
|---|---|---|---|---|
| 6,789,147 B1* | 9/2004 | Kessler | ................. | H04L 63/166 710/200 |
| 9,519,901 B1* | 12/2016 | Dorogusker | ......... | G06Q 20/401 |
| 2012/0023334 A1* | 1/2012 | Brickell | ................ | H04L 9/0844 713/169 |
| 2012/0159184 A1* | 6/2012 | Johnson | .............. | G06F 21/6218 713/189 |
| 2015/0334114 A1* | 11/2015 | Scarlata | .................. | G06F 21/62 713/170 |
| 2015/0372811 A1* | 12/2015 | Le Saint | ............... | H04L 9/0841 705/76 |
| 2016/0283411 A1* | 9/2016 | Sheller | ................ | G06F 12/1458 |
| 2016/0315937 A1* | 10/2016 | Al-Kadi | ................ | H04L 9/0861 |
| 2016/0344710 A1* | 11/2016 | Khan | .................... | H04L 63/061 |
| 2017/0083724 A1* | 3/2017 | Chhabra | ................ | G06F 21/72 |
| 2017/0091119 A1* | 3/2017 | Chhabra | ............. | G06F 12/0802 |

* cited by examiner

*Primary Examiner* — Oleg Korsak
*Assistant Examiner* — Devin E Almeida
(74) *Attorney, Agent, or Firm* — Barnes & Thornburg LLP

(57) ABSTRACT

Technologies for secure inter-enclave communication include a computing device having a processor with secure enclave support. The computing device establishes a first secure enclave and a second secure enclave with the secure enclave support of the processor. The first secure enclave invokes a report instruction to cause the processor to generate a report targeted to the second secure enclave. The report includes a report body and a message authentication code generated using a report key associated with the second secure enclave. The second secure enclave invokes a get key instruction to cause the processor to generate the report key associated with the second secure enclave and generates the message authentication code over the report body using the report key. The first secure enclave and second secure enclave each perform a cryptographic operation on a message using the message authentication code as a cryptographic key. Other embodiments are described and claimed.

23 Claims, 8 Drawing Sheets

TECHNOLOGIES FOR SECURE INTER-ENCLAVE COMMUNICATIONS

BACKGROUND

Current processors may provide support for a trusted execution environment such as a secure enclave. Secure enclaves include segments of memory (including code and/or data) protected by the processor from unauthorized access including unauthorized reads and writes. In particular, certain processors may include Intel® Software Guard Extensions (SGX) to provide secure enclave support. SGX provides confidentiality, integrity, and replay-protection to the secure enclave data while the data is resident in the platform memory and thus provides protection against both software and hardware attacks. The on-chip boundary forms a natural security boundary, where data and code may be stored in plaintext and assumed to be secure. Software applications may include multiple secure enclaves. Each secure enclave executed by a processor is protected from accesses performed by the other secure enclaves.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
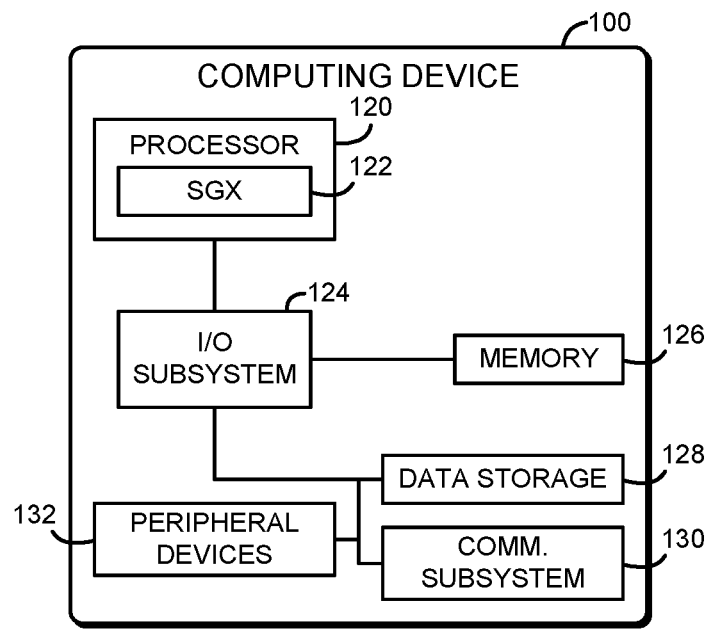
FIG. 1 is a simplified block diagram of at least one embodiment of a computing device for secure inter-enclave communication.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a computing device 100 for secure inter-enclave communication includes a processor 120 that supports secure enclaves (e.g., a processor 120 that supports Intel® SGX technology). In use, as described further below, the computing device 100 initializes two secure enclaves: a report generator enclave and a report target enclave. The computing device 100 may initialize and execute the enclaves at the same time or at different times, depending on the particular application and/or cryptographic operations performed. The report generator enclave uses a processor instruction of the processor 120 to generate a report targeted to the report target enclave. The report includes a report body and a message authentication code (MAC). The MAC is generated using a report key associated with the report target enclave. The report key is derived from a secret device key of the processor 120, and is thus not accessible directly by other enclaves. The report generator enclave strips the MAC from the report and provides the report body to the report target enclave. The report target enclave uses a processor instruction of the processor 120 to retrieve its own report key and then independently calculates the MAC over the report body. The MAC is used as a shared secret for both of the enclaves; that is, both the report generator enclave and the report target enclave may perform one or more cryptographic operations using the MAC of the report as the secret key. For example, the enclaves may use the MAC (or one or more session keys derived from the MAC) to protect an interactive messaging session. As another example, the enclaves may use the MAC to seal and/or unseal a message. Thus, the computing device 100 may provide a relatively simple and fast key derivation technique that supports both interactive and non-interactive use. Additionally, the key derivation technique may be implemented with small code size and thus may be used in resourced-constrained environments, such as in enclave initialization code that executes before an enclave heap and/or stack is established. Further, the computing device 100 supports generic inter-enclave sealing without requiring both enclaves to be produced and/or deployed by the same ISV.

The computing device 100 may be embodied as any type of computation or computer device capable of performing the functions described herein, including, without limitation, a computer, a desktop computer, a workstation, a server, a laptop computer, a notebook computer, a tablet computer, a mobile computing device, a wearable computing device, a network appliance, a web appliance, a distributed computing system, a processor-based system, and/or a consumer electronic device. As shown in FIG. 1, the computing device 100 illustratively includes a processor 120, an input/output subsystem 124, a memory 126, a data storage device 128, and a communication subsystem 130. Of course, the computing device 100 may include other or additional components, such as those commonly found in a desktop computer (e.g., various input/output devices), in other embodiments. Additionally, in some embodiments, one or more of the illustrative components may be incorporated in, or otherwise form a portion of, another component. For example, the memory 126, or portions thereof, may be incorporated in the processor 120 in some embodiments.

The processor 120 may be embodied as any type of processor capable of performing the functions described herein. The processor 120 may be embodied as a single or multi-core processor(s), digital signal processor, microcontroller, or other processor or processing/controlling circuit. As shown, the processor 120 includes secure enclave support 122, which allows the processor 120 to establish a trusted execution environment known as a secure enclave, in which executing code may be measured, verified, and/or otherwise determined to be authentic. Additionally, code and data included in the secure enclave may be encrypted or otherwise protected from being accessed by code executing outside of the secure enclave. For example, code and data included in the secure enclave may be protected by hardware protection mechanisms of the processor 120 while being executed or while being stored in certain protected cache memory of the processor 120. The code and data included in the secure enclave may be encrypted when stored in a shared cache or the main memory 126. The secure enclave support 122 may be embodied as a set of processor instruction extensions that allows the processor 120 to establish one or more secure enclaves in the memory 126. For example, the secure enclave support 122 may be embodied as Intel® Software Guard Extensions (SGX) technology.

The memory 126 may be embodied as any type of volatile or non-volatile memory or data storage capable of performing the functions described herein. In operation, the memory 126 may store various data and software used during operation of the computing device 100 such as operating systems, applications, programs, libraries, and drivers. Additionally, part of the memory 126 may be used as an enclave page cache (EPC) to store encrypted code and/or data for the secure enclaves established by the processor 120. The processor 120 may encrypt memory pages of each secure enclave before transferring the encrypted pages out of the processor 120 to the EPC within the memory 126.

The memory 126 is communicatively coupled to the processor 120 via the I/O subsystem 124, which may be embodied as circuitry and/or components to facilitate input/output operations with the processor 120, the memory 126, and other components of the computing device 100. For example, the I/O subsystem 124 may be embodied as, or otherwise include, memory controller hubs, input/output control hubs, platform controller hubs, integrated control circuitry, firmware devices, communication links (i.e., point-to-point links, bus links, wires, cables, light guides, printed circuit board traces, etc.) and/or other components and subsystems to facilitate the input/output operations. In some embodiments, the I/O subsystem 124 may form a portion of a system-on-a-chip (SoC) and be incorporated, along with the processor 120, the memory 126, and other components of the computing device 100, on a single integrated circuit chip.

The data storage device 128 may be embodied as any type of device or devices configured for short-term or long-term storage of data such as, for example, memory devices and circuits, memory cards, hard disk drives, solid-state drives, or other data storage devices. In some embodiments, the data storage device 128 may be used to store one or more executable binary images. Each executable binary image may include unencrypted code and/or data that is to be initially loaded into a secure enclave and then measured or otherwise verified before the secure enclave is executed.

The communication subsystem 130 of the computing device 100 may be embodied as any communication circuit, device, or collection thereof, capable of enabling communications between the computing device 100 and other remote devices over a network. The communication subsystem 130 may be configured to use any one or more communication technology (e.g., wired or wireless communications) and associated protocols (e.g., Ethernet, Bluetooth®, Wi-Fi®, WiMAX, etc.) to effect such communication.

As shown, the computing device 100 may also include one or more peripheral devices 132. The peripheral devices 132 may include any number of additional input/output devices, interface devices, and/or other peripheral devices. For example, in some embodiments, the peripheral devices 132 may include a display, touch screen, graphics circuitry, keyboard, mouse, speaker system, microphone, network interface, and/or other input/output devices, interface devices, and/or peripheral devices.

Figure 2:
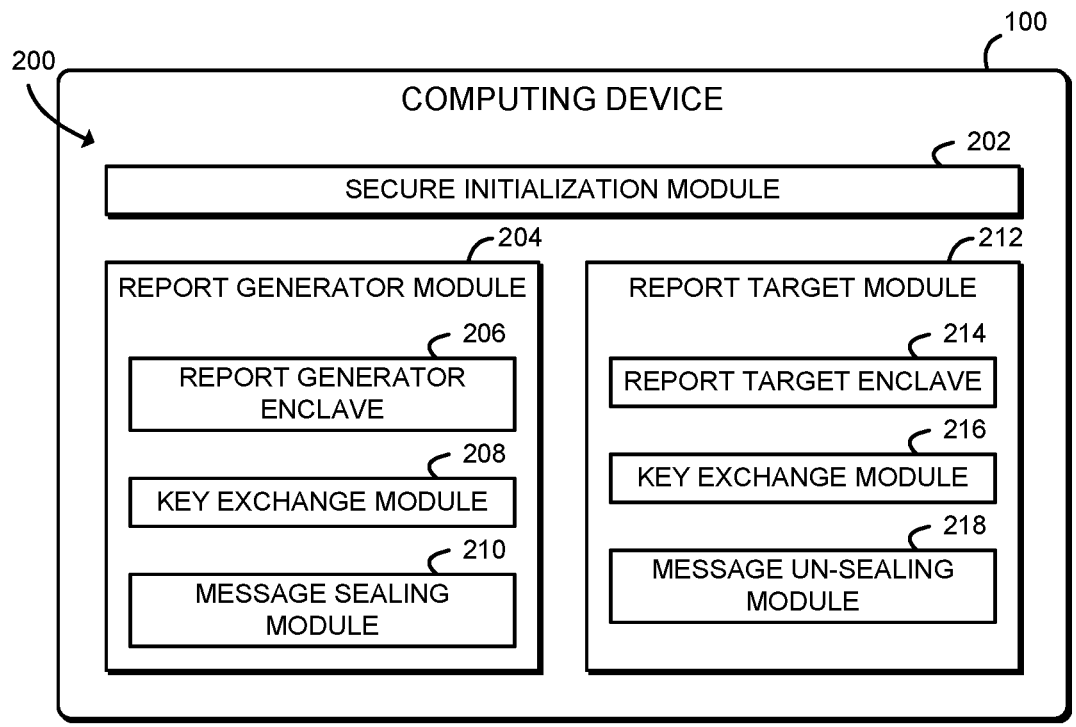
FIG. 2 is a simplified block diagram of at least one embodiment of an environment that may be established by the computing device of FIG. 1.

Referring now to FIG. 2, in an illustrative embodiment, the computing device 100 establishes an environment 200 during operation. The illustrative environment 200 includes a secure initialization module 202, a report generator module 204, and a report target module 212. The various modules of the environment 200 may be embodied as hardware, firmware, software, or a combination thereof. As such, in some embodiments, one or more of the modules of the environment 200 may be embodied as circuitry or collection of electrical devices (e.g., secure initialization circuitry 202, report generator circuitry 204, and/or report target circuitry 212). It should be appreciated that, in such embodiments, one or more of the secure initialization circuitry 202, the report generator circuitry 204, and/or the report target circuitry 212 may form a portion of one or more of the processor 120, the I/O subsystem 124, and/or other components of the computing device 100. Additionally, in some embodiments, one or more of the illustrative modules may form a portion of another module and/or one or more of the illustrative modules may be independent of one another.

The report generator module 204 is configured to invoke a report instruction to cause the processor 120 to generate a report targeted to a report target enclave 214. The report instruction is invoked from within a report generator enclave 206, and both of the enclaves 206, 214 are protected with the secure enclave support 122 of the processor 120. The report generated by the processor 120 includes a report body and a message authentication code. The message authentication code is generated as a function of the report body and a report key that is associated with the report target enclave 214. The report generator module 204 is further configured to perform, by the report generator enclave 206, a cryptographic operation on a message, using the message authentication code of the report as a cryptographic key.

The report target module 212 is configured to invoke, by the report target enclave 214, a get key instruction to cause the processor 120 to generate the report key associated with the report target enclave 214. The report target module 212 is further configured to generate, by the report target enclave 214, the message authentication code using the report key over the report body received from the report generator enclave 206. The report target module 212 is further configured to perform, by the report target enclave 214, a cryptographic operation on the message, using the message authentication code of the report as the cryptographic key. The report target module 212 may be further configured to verify, by the report target enclave 214, a measurement of the report generator enclave 206 that is included in the report body.

In some embodiments, performing the cryptographic operation(s) on the message may include protecting an interactive secure messaging session between the report generator enclave 206 and the report target enclave 214 using the message authentication code of the report as the cryptographic key. In those embodiments, the report target module 212 may be configured to generate, by the report target enclave 214, a random nonce and transmit the nonce from the report target enclave 214 to the report generator enclave 206. In those embodiments, the report generator module 204 may be configured to generate, by the report generator enclave 206, another random nonce and then generate report data as a function of the random nonces and a domain separation constant. In those embodiments, the report generator module 204 may be further configured to derive, by the report generator enclave 206, a message authentication code key as a function of the message authentication code of the report and a domain separation constant, to generate, by the report generator enclave 206, a receiver message authentication code over the report data using the message authentication code key, and to transmit the report body, the random nonce generated by the report generator enclave 206, and the receiver message authentication code from the report generator enclave 206 to the report target enclave 214. In those embodiments, the report target module 212 may be further configured to derive, by the report target enclave 214, the message authentication code key as a function of the message authentication code of the report and the domain separation constant, and to verify, by the report target enclave 214, the receiver message authentication code with the report data and the message authentication code key. The report target module 212 may be further configured to generate, by the report target enclave 214, an initiator message authentication code with the message authentication code key over the random nonce received from the report generator enclave 206 and to transmit the initiator message authentication code from the report target enclave 214 to the report generator enclave 206. The report generator module 204 may be further configured to verify, by the report generator enclave 206, the initiator message authentication code with the random nonce generated by the report generator enclave 206 and the message authentication code key. In some embodiments, those functions may be performed by one or more sub-modules, such as a key exchange module 208 of the report generator module 204 and/or a key exchange module 216 of the report target module 212.

In some embodiments, performing the cryptographic operation(s) on the message may include sealing the message by the report generator enclave 206 to generate an encrypted message and unsealing the encrypted message by the report target enclave 214, using the message authentication code of the report as the cryptographic key. In those embodiments, the report generator module 204 may be further configured to generate, by the report generator enclave 206, a random nonce and to generate, by the report generator enclave 206, report data as a function of the random nonce and a domain separation constant. The report generator enclave 206 may be further configured to store, by the report generator enclave 206, the report body, the random nonce, and the encrypted message. In those embodiments, the report target module 212 may be further configured to further to verify, by the report target enclave 214, the report data with the random nonce and the domain separation constant. In some embodiments, those functions may be performed by one or more sub-modules, such as a message sealing module 210 of the report generator module 204 and/or a message un-sealing module 218 of the report target module 212.

The secure initialization module 202 is configured to initialize the report generator enclave 206 and the report target enclave 214 using the secure enclave support 122 of the processor 120. For example, the enclaves 206, 214 may be loaded and initialized using Intel SGX technology.

Figure 3:
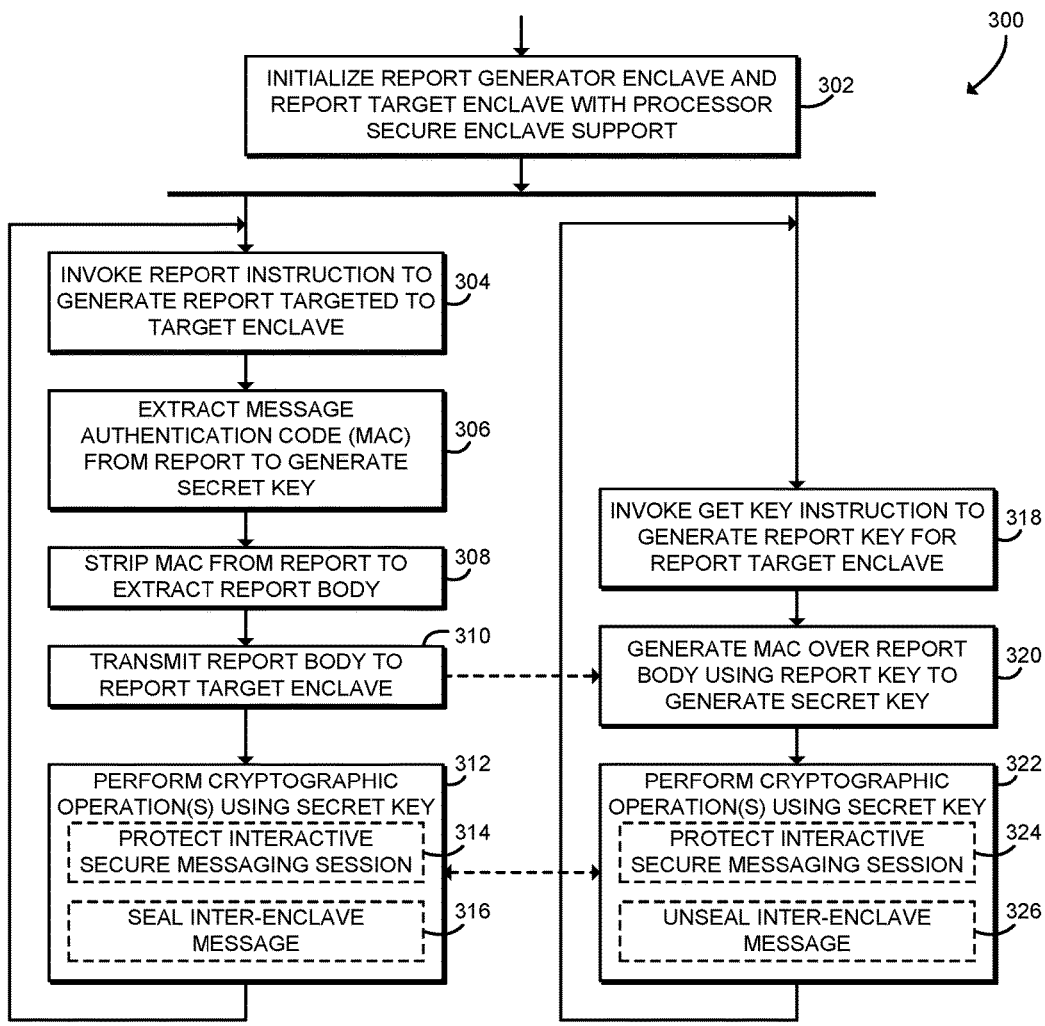
FIG. 3 is a simplified flow diagram of at least one embodiment of a method for secure inter-enclave communication that may be executed by the computing device of FIGS. 1-2.

Referring now to FIG. 3, in use, the computing device 100 may execute a method 300 for secure inter-enclave communication. The method 300 begins in block 302, in which the computing device 100 initializes the report generator enclave 206 and the report target enclave 214 using the secure enclave support 122 of the processor 120. The computing device 100 may load the contents of each enclave 206, 214 into the memory 126 and generate an associated cryptographic measurement. The measurement of each enclave may be computed using a cryptographic hash of the contents of the secure enclave, and may be stored in a measurement register known as MRENCLAVE. After loading and measuring the enclaves 206, 214, the computing device 100 may initialize the enclaves 206, 214, for example by executing a processor instruction such as EINIT. Initializing the enclaves 206, 214 locks the respective measurement of each enclave 206, 214 and allows the enclaves 206, 214 to be executed. After initializing the enclaves 206, 214, the computing device 100 executes each enclave 206, 214 independently. Additionally, although illustrated as initializing the enclaves 206, 214 in the same operation, it should be understood that the computing device 100 may initialize the enclaves 206, 214 at different times. For example, the report generator enclave 206 may be initialized and complete execution prior to the report target enclave 214 being initialized and executing.

After initializing the report generator enclave 206 in block 302, execution of the method 300 by the report generator enclave 206 advances to block 304. In block 304, the computing device 100, from within the report generator enclave 206, invokes a report instruction of the processor 120 to generate a report targeted to the report target enclave 214. For example, the computing device 100 may execute the EREPORT instruction, which generates a report object. The computing device 100 may identify the report target enclave 214 by providing the corresponding measurement value (e.g., MRENCLAVE) as a parameter to the EREPORT instruction. When executing the EREPORT instruction, the processor 120 generates a report key for the report target enclave 214. The report key is derived from a secret device key of the processor 120. The report key may also be derived using a value KEYID for key wear-out protection that changes on every reboot of the computing device 100. The report key is used to generate a cipher-based message authentication code (CMAC) over the body of the report object, which is included in a field of the report object after being calculated. In the illustrative embodiment, the CMAC is generated using the AES-CMAC algorithm; however, in other embodiments any CMAC algorithm that is considered to be secure may be used. The report body may include report data provided by the report generator enclave 206 that is thus covered by the CMAC of the report object. In some embodiments, the report object may be embodied as a 432-byte data structure with a layout as described in Table 1, below. As shown in Table 1, the report body may be embodied as the first 416 bytes of the report structure, and the MAC may be embodied as the last 16 bytes of the report structure. In those embodiments, the MAC may be calculated over the first 384 bytes of the report structure (i.e., the report body excluding the KEYID field).

TABLE 1

Layout of REPORT structure

| Field | Offset (bytes) | Size (bytes) | Description |
|---|---|---|---|
| CPUSVN | 0 | 16 | Security version number of processor |
| MISCSELECT | 16 | 4 | SSA Frame specified extended feature set bit vector |
| RESERVED | 20 | 28 | Must be zero |
| ATTRIBUTES | 48 | 16 | Values of attribute flags for enclave |
| MRENCLAVE | 64 | 32 | Value of measurement register |
| RESERVED | 96 | 32 | Reserved |
| MRSIGNER | 128 | 32 | The value of SECS.MRSIGNER |
| RESERVED | 160 | 96 | Zero |
| ISVPRODID | 256 | 02 | Enclave PRODUCT ID |
| ISVSVN | 258 | 02 | Security version number of enclave |
| RESERVED | 260 | 60 | Zero |
| REPORTDATA | 320 | 64 | Data may be provided in the ERPORT call in RCX |
| KEYID | 384 | 32 | Value for key wear-out protection |
| MAC | 416 | 16 | The CMAC on the report using report key |

In block 306, the computing device 100, from within the report generator enclave 206, extracts the MAC from the report to generate a secret key. As described above, the computing device 100 may use the last 16 bytes of the report structure as the secret key. In block 308, the computing device 100, from within the report generator enclave 206, strips the MAC from the report to extract the report body. For example, the computing device 100 may zero out the last 16 bytes of the report structure or extract the first 416 bytes of the report structure to extract the report body.

In block 310, the computing device 100, from within the report generator enclave 206, transmits the report body to the report target enclave 214. The computing device 100 may transmit the report body via any communication mechanism. Transmission of the report body need not be secured, because the secret key (i.e., the MAC) has been stripped from the report. For example, the computing device 100 may transmit the report body to the report target enclave 214 through an unsecured shared memory buffer, an unsecured inter-process communication channel, or other technique. Additionally or alternatively, in some embodiments the computing device 100 may store the report body for later use by the report target enclave 214, such as when the report target enclave 214 has not yet been initialized. Thus, the enclaves 206, 214 are not required to establish an interactive communication session.

In block 312, the computing device 100, from within the report generator enclave 206, performs one or more cryptographic operations using the secret key extracted as described above in connection with block 306. The computing device 100 may encrypt data, decrypt data, integrity-protect data, and/or perform any other appropriate cryptographic operations using the secret key. In some embodiments, the computing device 100 may derive one or more session keys based on the secret key to perform the cryptographic operations. In some embodiments, in block 314, the computing device 100 may protect an interactive secure messaging session between the report generator enclave 206 and the report target enclave 214. Thus, in those embodiments the method 300 may be used to perform a secure key exchange between the enclaves 206, 214. One potential embodiment of a method for secure key exchange is described below in connection with FIGS. 4A and 4B. In some embodiments, in block 316, the computing device 100 may seal an inter-enclave message. Sealing the message generates an encrypted message that may only be un-sealed (e.g., decrypted) by the report target enclave 214. One potential embodiment of a method for inter-enclave message sealing and unsealing is described below in connection with FIGS. 6A and 6B. After performing the cryptographic operation, the method 300 loops back to block 304, in which the report generator enclave 206 may generate additional reports.

Referring back to block 302, after initializing the report target enclave 214, execution of the method 300 by the report target enclave 214 advances to block 318. In block 318, the computing device 100, from within the report target enclave 214, executes a get key instruction to generate the report key for the report target enclave 214. For example, the computing device 100 may execute the EGETKEY instruction with an appropriate parameter to request the report key. When executing the EGETKEY instruction, the processor 120 generates the report key for the report target enclave 214. As described above in connection with block 304, the report key is derived from a secret device key of the processor 120. The report key may also be derived using a value KEYID for key wear-out protection. The computing device 100 may also supply a parameter that includes the value of KEYID included in the report body generated by the report generator enclave 206. In the illustrative embodiment, the processor 120 returns a 128-bit report key.

In block 320, the computing device 100, from within the report target enclave 214, generates a MAC over the report body using the report key, to generate the secret key. As described above, the report target enclave 214 may receive the report body from the report generator enclave 206 using any appropriate communication technique, which may not be secure. For example, the report target enclave 214 may receive the report body through an unsecured shared memory buffer, an unsecured inter-process communication channel, or other technique. Additionally or alternatively, in some embodiments the report target enclave 214 may read the report body that was previously stored by the report generator enclave 206. To calculate the MAC, the computing device 100 may perform the same computation performed by the processor 120 when generating the report as described above in connection with block 304. For example, the computing device 100 may generate the MAC over the first 384 bytes of the report body (e.g., the report body excluding the KEYID field), using the report key. As described above, in the illustrative embodiment, the CMAC is generated using the AES-CMAC algorithm; however, in other embodiments the computing device 100 may use any MAC algorithm that matches the algorithm used by the processor 120 to generate the MAC as described above in connection with block 304. As described above in connection with block 306, the MAC itself (e.g., the 16-byte MAC value) may be used as the secret key.

In block 322, the computing device 100, from within the report target enclave 214, performs one or more cryptographic operations using the secret key determined as described above in connection with block 320. The computing device 100 may encrypt data, decrypt data, integrity-protect data, and/or perform any other appropriate cryptographic operations using the secret key. In some embodiments, the computing device 100 may derive one or more session keys based on the secret key to perform the cryptographic operations. In some embodiments, in block 324, the computing device 100 may protect an interactive secure messaging session between the report target enclave 214 and the report generator enclave 206. Thus, in those embodiments the method 300 may be used to perform a secure key exchange between the enclaves 206, 214. One potential embodiment of a method for secure key exchange is described below in connection with FIGS. 4A and 4B. In some embodiments, in block 326, the computing device 100 may unseal an inter-enclave message. Unsealing the message recovers a decrypted message that was sealed (e.g., encrypted) by the report generator enclave 206. One potential embodiment of a method for inter-enclave message sealing and unsealing is described below in connection with FIGS. 6A and 6B. After performing the cryptographic operation, the method 300 loops back to block 318, in which the report target enclave 214 may receive additional reports.

Figure 4A:
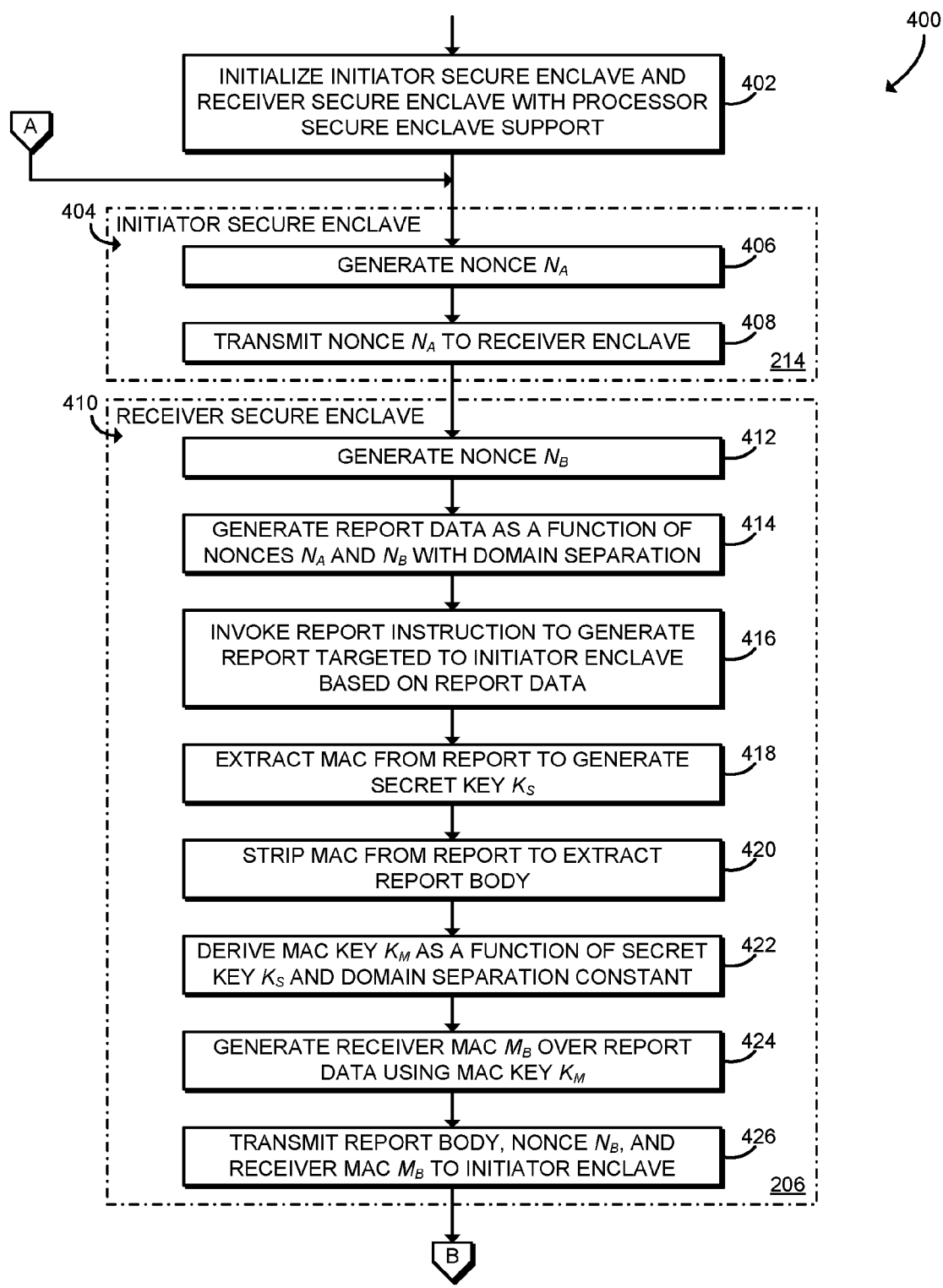
FIGS. 4A and 4B are a simplified flow diagram of at least one embodiment of a method for secure inter-enclave key exchange that may be executed by the computing device of FIGS. 1-2.
Figure 4B:
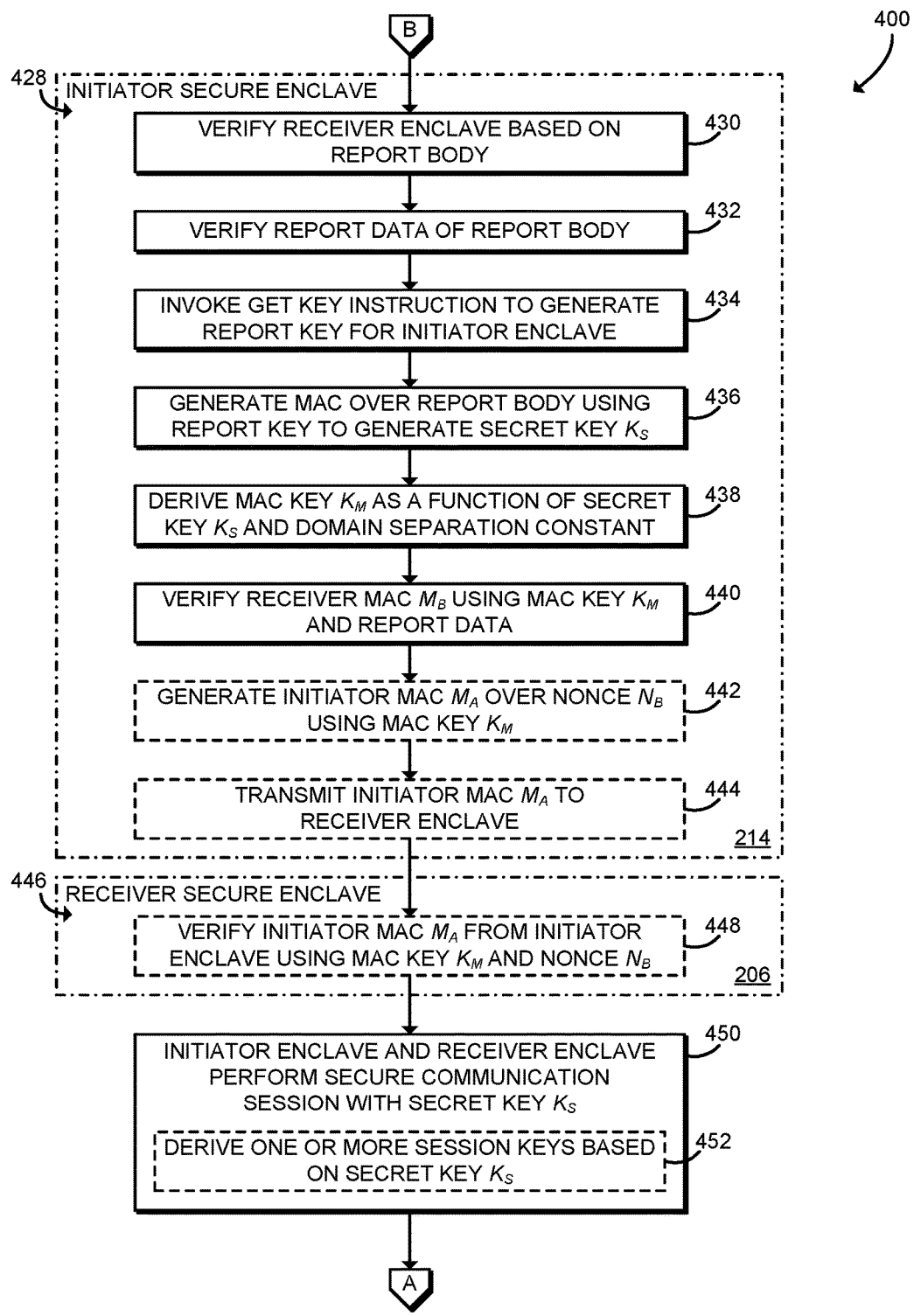

Referring now to FIGS. 4A and 4B, in use, the computing device 100 may execute a method 400 for secure inter-enclave key exchange. The method 400 begins in block 402, in which the computing device 100 initializes an initiator secure enclave and a receiver secure enclave using the secure enclave support 122 of the processor 120. In the illustrative embodiment, the initiator secure enclave is the report target enclave 214, and the receiver secure enclave is the report generator enclave 206; however, it should be understood that in some embodiments the roles of initiator and receiver may be swapped. As described above in connection with block 302 of FIG. 3, the computing device 100 may load the contents of each enclave 206, 214 into memory 126 and generate an associated cryptographic measurement. The measurement of each enclave may be computed using a cryptographic hash of the contents of the secure enclave, and may be stored in a measurement register known as MRENCLAVE. After loading and measuring the enclaves 206, 214, the computing device 100 may initialize the enclaves 206, 214, for example by executing a processor instruction such as EINIT. Initializing the enclaves 206, 214 locks the respective measurement of each enclave 206, 214 and allows the enclaves 206, 214 to be executed. After initializing the enclaves 206, 214, the computing device 100 executes each enclave 206, 214 independently.

Execution of the method 400 proceeds to block grouping 404, which is executed by the initiator secure enclave 214. In block 406, the computing device 100 from within the initiator secure enclave 214 generates a random nonce $N_A$. In the illustrative embodiment, the random nonce $N_A$ is the same size as the shared secret (e.g., 128 bits); however the size of $N_A$ may vary in other embodiments. The random nonce $N_A$ may be generated with a cryptographic pseudo-random number generator, for example using the RDRAND/RDSEED instructions provided by certain processors 120. In block 408, the computing device 100 transmits the random nonce $N_A$ from the initiator secure enclave 214 to the receiver secure enclave 206. The computing device 100 may use any appropriate communication technique to transmit the nonce $N_A$, including transmitting through an unsecured shared memory buffer or unsecured inter-process communication channel. The nonce $N_A$ need not be secured in transit.

Execution of the method 400 proceeds to block grouping 410, which is executed by the receiver secure enclave 206. In block 412, the computing device 100 from within the receiver secure enclave 206 generates a random nonce $N_B$. The nonce may be generated using a similar technique as used to generate the nonce $N_A$, and the nonce $N_B$ may be of the same size as the nonce $N_A$. In block 414, the computing device 100 from within the receiver secure enclave 206 generates report data as a function of the nonces $N_A$, $N_B$, and a domain separator. For example, the computing device 100 may concatenate a predefined constant (such as the string "RPT/IEKX") with the nonces $N_A$ and $N_B$ and then generate a hash value of the concatenation to be used as the report data. Including the domain separation constant may help reduce the likelihood that a resulting MAC of the report would collide with MACs generated by other usages of the EREPORT instruction. The illustrative embodiment uses the SHA-256 algorithm; however, the computing device 100 may use any cryptographic hash algorithm that is deemed to be secure.

In block 416, the computing device 100 from within the receiver secure enclave 206 invokes the report instruction of the processor 120 to generate a report targeted to the initiator secure enclave 214. For example, the computing device 100 may execute the EREPORT instruction, which generates a report object. The computing device 100 supplies the report data as a parameter to the EREPORT instruction. As described above in connection with block 304 of FIG. 3, executing the EREPORT instruction generates a report structure, which includes a report body and a MAC calculated over the report body. The report body includes the report data calculated as described above.

In block 418, the computing device 100 from within the receiver secure enclave 206 extracts the MAC from the report to generate a secret key $K_S$. As described above, the computing device 100 may use the last 16 bytes of the report structure as the secret key $K_S$. In block 420, the computing device 100 from within the receiver secure enclave 206, strips the MAC from the report to extract the report body. For example, the computing device 100 may zero out the last 16 bytes of the report structure or extract the first 416 bytes of the report structure to extract the report body.

In block 422, the computing device 100 from within the receiver secure enclave 206 derives a MAC key $K_M$ as a function of the secret key $K_S$ and a domain separation constant. The computing device 100 may use any appropriate key derivation function to derive the MAC key $K_M$. The domain separation constant used depends on the particular embodiment and may be used to reduce the likelihood of collision. In block 424, the computing device 100 from within the receiver secure enclave 206 generates a receiver MAC $M_B$ over the report data using the MAC key $K_M$. The computing device 100 may use any appropriate MAC function to generate the receiver MAC $M_B$. Because the report data is generated as a function of the nonces $N_A$ and $N_B$, the receiver MAC $M_B$ may be used to verify the liveness of the receiver secure enclave 206. In block 426, the computing device 100 transmits the report body, the nonce $N_B$, and the receiver MAC $M_B$ from the receiver secure enclave 206 to the initiator secure enclave 214. As described above, the computing device 100 may use any appropriate communication technique for transmission, including unsecure communication techniques.

Execution of the method 400 proceeds to block grouping 428, shown in FIG. 4B, which is executed by the initiator secure enclave 214. In block 430, the computing device 100 from within the initiator secure enclave 214 verifies the receiver secure enclave 206 based on the report body. For example, the computing device 100 may verify that the enclave measurement included in the report body (e.g., the MRENCLAVE field) matches the expected measurement of the receiver secure enclave 206. In block 432, the computing device 100 from within the initiator secure enclave 214 verifies the report data of the report body. For example, the computing device 100 may verify that the report data included in the report body equals the hash of the domain separation constant concatenated with the nonces $N_A$ and $N_B$ as described above in connection with block 414.

In block 434, the computing device 100 from within the initiator secure enclave 214 executes a get key instruction to generate the report key for the initiator secure enclave 214. For example, the computing device 100 may execute the EGETKEY instruction with an appropriate parameter to request the report key. When executing the EGETKEY instruction, the processor 120 generates the report key for the initiator secure enclave 214. As described above, the report key is derived from a secret device key of the processor 120. The report key may also be derived using a value KEYID for key wear-out protection. The computing device 100 may also supply a parameter that includes the value of KEYID included in the report body generated by the receiver secure enclave 206. In the illustrative embodiment, the processor 120 returns a 128-bit report key.

In block 436, the computing device 100 from within the initiator secure enclave 214 generates a MAC over the report body using the report key, to generate the secret key $K_S$. To calculate the MAC, the computing device 100 may perform the same computation performed by the processor 120 when generating the report as described above in connection with block 416. For example, the computing device 100 may generate the MAC over the first 384 bytes of the report body (e.g., the report body excluding the KEYID field), using the report key. In the illustrative embodiment, the computing device 100 calculates the MAC using the AES-CMAC algorithm; however, any appropriate cipher-based message authentication code (CMAC) algorithm may be used to calculate the MAC. As described above in connection with block 418, the MAC itself (e.g., the 16-byte MAC value) may be used as the secret key $K_S$.

In block 438, the computing device 100 from within the initiator secure enclave 214 derives the MAC key $K_M$ as a function of the secret key $K_S$ and a domain separation constant. The computing device 100 may use any appropriate key derivation function to derive the MAC key $K_M$. As described above, the domain separation constant used depends on the particular embodiment and may be used to reduce the likelihood of collision. The computing device 100 determines the same MAC key $K_M$ as described above in connection with block 422 of FIG. 4A. In block 440, the computing device 100 from within the initiator secure enclave 214 verifies the receiver MAC $M_B$ and the report data received from the receiver secure enclave 206. For example, the computing device 100 may calculate a MAC over the report data using the MAC key $K_M$ and compare that calculated value to the receiver MAC $M_B$ received from the receiver secure enclave 206.

In block 442, in some embodiments, the computing device 100 from within the initiator secure enclave 214 may generate an initiator MAC $M_A$ over the nonce $N_B$ using the MAC key $K_M$. In block 444, in some embodiments, the computing device 100 may transmit the initiator MAC $M_A$ from the initiator secure enclave 214 to the receiver secure enclave 206. Execution of the method 400 proceeds to block grouping 446, which is executed by the receiver secure enclave 206. In block 448, in some embodiments the computing device 100 from within the receiver secure enclave 206 may verify the initiator MAC $M_A$ received from the initiator secure enclave 214 using the MAC key $K_M$ and the nonce $N_B$. For example, the computing device 100 may calculate a MAC over the nonce $N_B$ using the MAC key $K_M$ and compare that calculated value to the initiator MAC $M_A$ received from the initiator secure enclave 214.

Execution of the method 400 proceeds to block 450, in which the computing device 100 performs a secure communication session between the initiator secure enclave 206 and the receiver secure enclave 214 protected by the secret key $K_S$. The computing device 100 may use any cryptographic algorithm or other technique to protect communications between the secure enclaves 206, 214 using the secret key $K_S$ as a shared secret. In some embodiments, in block 452 the computing device 100 may derive one or more session keys based on the secret key $K_S$. For example, the secure enclaves 206, 214 may each independently derive one or more symmetric encryption keys based on the secret key $K_S$ and then use those session keys to protect the communication session. After performing the secure communication session, the method 400 loops back to block 406, shown in FIG. 4A, to perform additional secure key exchanges.

Figure 5:
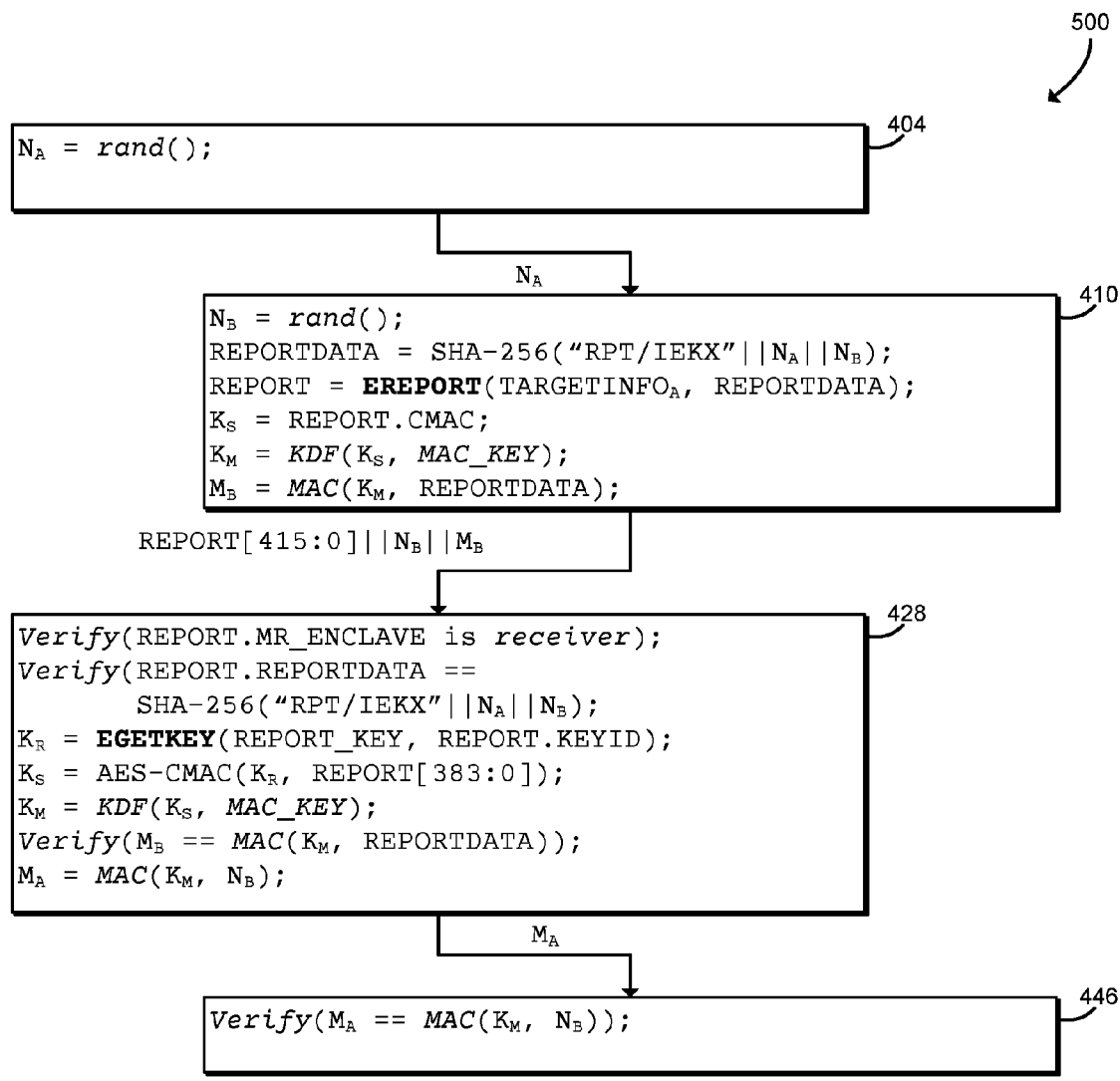
FIG. 5 is a pseudocode diagram illustrating at least one embodiment of the method of FIGS. 4A and 4B.

Referring now to FIG. 5, pseudocode diagram 500 illustrates one potential embodiment of the method 400 described above in connection with FIGS. 4A and 4B. As described above, the initiator secure enclave 214 executes the block grouping 404 and then transmits the nonce $N_A$ to the receiver secure enclave 206. The receiver secure enclave 206 executes the block grouping 410, which includes executing the EREPORT instruction. The parameter TARGETINFO$_A$ provided to the EREPORT instruction identifies the initiator secure enclave 214. As shown, the MAC key $K_M$ is generated using a domain separation constant MAC_KEY. The receiver secure enclave 206 transmits the report body (i.e., REPORT[415:0], the nonce $N_B$, and the receiver MAC $M_B$ to the initiator secure enclave 214. The initiator secure enclave 214 executes the block grouping 428, which includes executing the EGETKEY instruction. The initiator secure enclave 214 transmits the initiator MAC $M_A$ to the receiver secure enclave 206. The receiver secure enclave 206 executes the block grouping 446, and then the secure key exchange process is completed. Both enclaves 206, 214 possess the same secret key $K_S$, which may be used to derive session keys or otherwise protect a secure communication session.

Figure 6A:
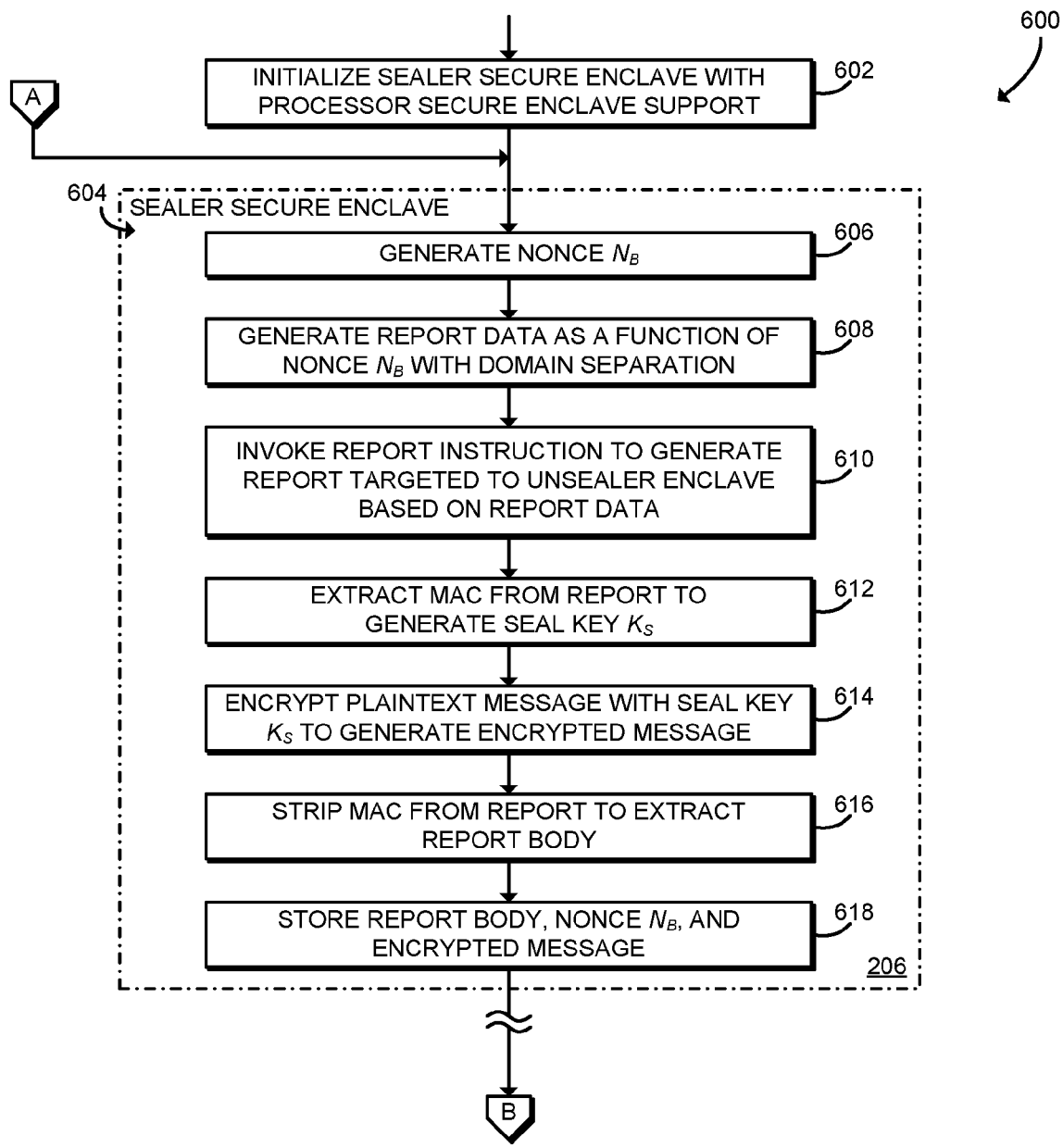
FIGS. 6A and 6B are a simplified flow diagram of at least one embodiment of a method for secure inter-enclave message sealing and unsealing that may be executed by the computing device of FIGS. 1-2.
Figure 6B:
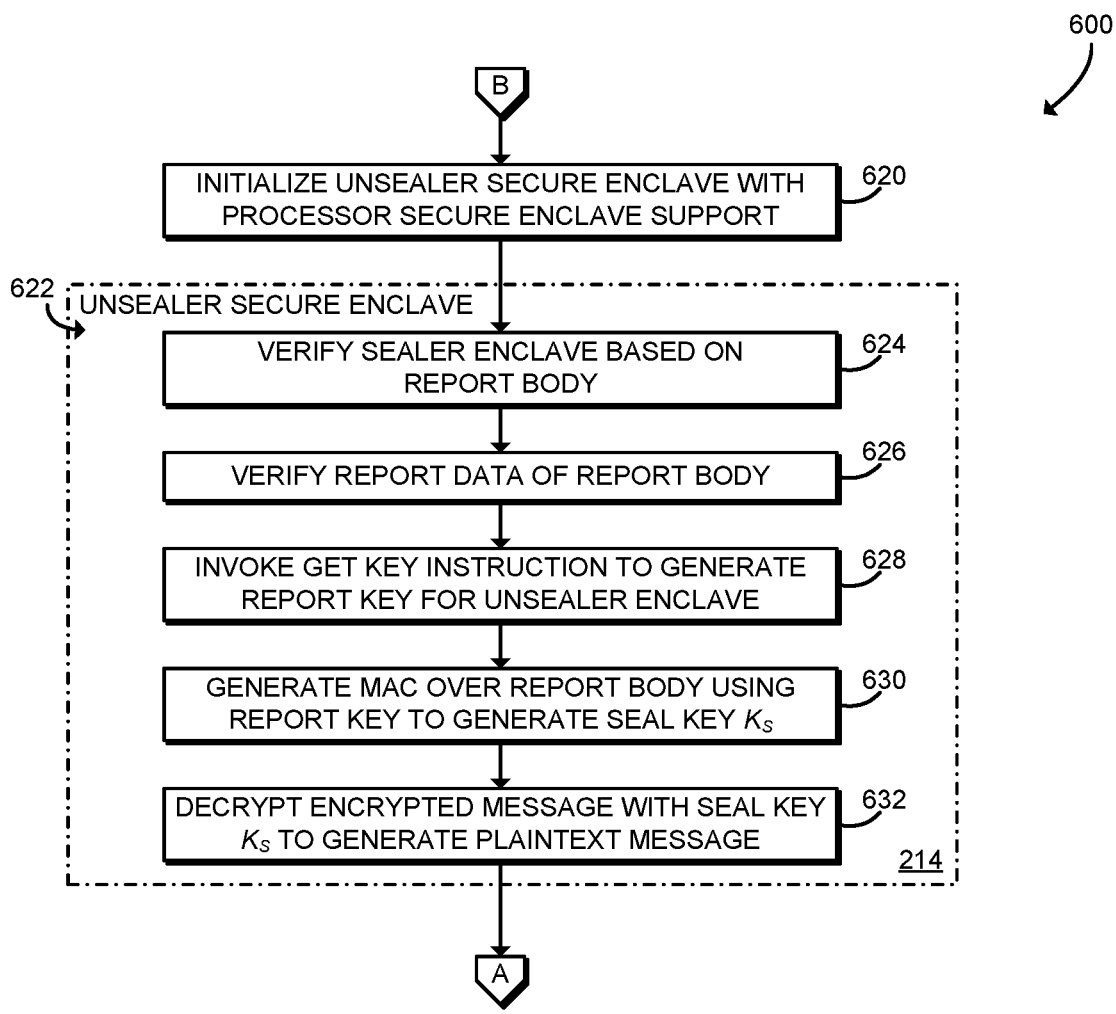

Referring now to FIGS. 6A and 6B, in use, the computing device 100 may execute a method 600 for secure inter-enclave message sealing and unsealing. The method 600 begins in block 602, in which the computing device 100 initializes a sealer secure enclave using the secure enclave support 122 of the processor 120. In the illustrative embodiment, the sealer secure enclave is the report generator enclave 206. As described above in connection with block 302 of FIG. 3, the computing device 100 may load the contents of the enclave 206 into the memory 126 and generate an associated cryptographic measurement. The measurement of the enclave may be computed using a cryptographic hash of the contents of the secure enclave, and may be stored in a measurement register known as MRENCLAVE. After loading and measuring the enclave 206, the computing device 100 may initialize the enclave 206, for example by executing a processor instruction such as EINIT. Initializing the enclave 206 locks the measurement of the enclave 206 and allows the enclave 206 to be executed.

Execution of the method 600 proceeds to block grouping 604, which is executed by the sealer secure enclave 206. In block 606, the computing device 100 from within the sealer secure enclave 206 generates a random nonce $N_B$. In the illustrative embodiment, the random nonce $N_B$ is the same size as the shared secret (e.g., 128 bits); however the size of $N_B$ may vary in other embodiments. The random nonce $N_B$ may be generated with a cryptographic pseudo-random number generator, for example using the RDRAND/RDSEED instructions provided by certain processors 120.

In block 608, the computing device 100 from within the sealer secure enclave 206 generates report data as a function of the nonce $N_B$ and a domain separator. For example, the computing device 100 may concatenate a predefined constant (such as the string "RPT/IES") with the nonce $N_B$ and then generate a hash value of the concatenation to be used as the report data. The illustrative embodiment uses the SHA-256 algorithm; however, the computing device 100 may use any cryptographic hash algorithm that is deemed to be secure. Including the domain separation constant may help reduce the likelihood that a resulting MAC of the report would collide with MACs generated by other usages of the EREPORT instruction.

In block 610, the computing device 100 from within the sealer secure enclave 206 invokes the report instruction of the processor 120 to generate a report targeted to an unsealer secure enclave. As described further below, the unsealer secure enclave is the report target enclave 214. In particular, the computing device 100 may execute the EREPORT instruction, which generates a report object. The computing device 100 supplies the report data as a parameter to the EREPORT instruction. As described above in connection with block 304 of FIG. 3, executing the EREPORT instruction generates a report structure, which includes a report body and a MAC calculated over the report body. The report body includes the report data calculated as described above.

In block 612, the computing device 100 from within the sealer secure enclave 206 extracts the MAC from the report to generate a seal key $K_S$. As described above, the computing device 100 may use the last 16 bytes of the report structure as the seal key $K_S$ or in some embodiments may use the last 16 bytes of the report structure to derive the seal key $K_S$. In block 614, the computing device 100 from within the sealer secure enclave 206 encrypts a plaintext message with the seal key $K_S$ to generate an encrypted message. The computing device 100 may use any appropriate cryptographic algorithm to generate the encrypted message. For example, the computing device 100 may use an authenticated encryption with associated data (AEAD) algorithm. In block 616, the computing device 100 from within the sealer secure enclave 206 strips the MAC from the report to extract the report body. For example, the computing device 100 may zero out the last 16 bytes of the report structure or extract the first 416 bytes of the report structure to extract the report body.

In block 618, the computing device 100 from within the sealer secure enclave 206 stores the report body, the nonce $N_B$, and the encrypted message in any location accessible by the unsealer secure enclave 214. For example, the computing device 100 may store the report body, the nonce $N_B$, and the encrypted message into a location in the data storage device 128 and/or a buffer in the memory 126. The storage location for the report body, the nonce $N_B$, and the encrypted message need not be secure. The computing device 100 may store the report body, the nonce $N_B$, and the encrypted message in any appropriate format.

Execution of the method 600 proceeds to block 620, shown in FIG. 6B. In block 620, the computing device 100 initializes the unsealer secure enclave using the secure enclave support 122 of the processor 120. In the illustrative embodiment, the unsealer secure enclave is the report target enclave 214. As described above in connection with block 302 of FIG. 3, the computing device 100 may load the contents of the enclave 214 into the memory 126 and generate an associated cryptographic measurement. The measurement of the enclave may be computed using a cryptographic hash of the contents of the secure enclave, and may be stored in a measurement register known as MRENCLAVE. After loading and measuring the enclave 214, the computing device 100 may initialize the enclave 214, for example by executing a processor instruction such as EINIT. Initializing the enclave 214 locks the measurement of the enclave 214 and allows the enclave 214 to be executed.

Execution of the method 600 proceeds to block grouping 622, which is executed by the unsealer secure enclave 214. In block 624, the computing device 100 from within the unsealer secure enclave 214 verifies the sealer secure enclave 206 based on the report body. For example, the computing device 100 may verify that the enclave measurement included in the report body (e.g., the MRENCLAVE field) matches the expected measurement of the sealer secure enclave 206. In block 626, the computing device 100 from within the unsealer secure enclave 214 verifies the report data of the report body. For example, the computing device 100 may verify that the report data included in the report body equals the hash of the domain separation constant concatenated with the nonce $N_B$ as described above in connection with block 608.

In block 628, the computing device 100 from within the unsealer secure enclave 214 executes a get key instruction to generate the report key for the unsealer secure enclave 214. For example, the computing device 100 may execute the EGETKEY instruction with an appropriate parameter to request the report key. When executing the EGETKEY instruction, the processor 120 generates the report key for the unsealer secure enclave 214. As described above, the report key is derived from a secret device key of the processor 120. The report key may also be derived using a value KEYID for key wear-out protection. The computing device 100 may also supply a parameter that includes the value of KEYID included in the report body generated by the sealer secure enclave 206. In the illustrative embodiment, the processor 120 returns a 128-bit report key.

In block 630, the computing device 100 from within the unsealer secure enclave 214 generates a MAC over the report body using the report key, to generate the seal key $K_S$. To calculate the MAC, the computing device 100 may perform the same computation performed by the processor 120 when generating the report as described above in connection with block 610. For example, the computing device 100 may generate the MAC over the first 384 bytes of the report body (e.g., the report body excluding the KEYID field), using the report key. In the illustrative embodiment, the computing device 100 calculates the MAC using the AES-CMAC algorithm; however, any appropriate cipher-based message authentication code (CMAC) algorithm may be used to calculate the MAC. As described above in connection with block 612, the MAC itself (e.g., the 16-byte MAC value) may be used as the seal key $K_S$, or the MAC may be used to derive the seal key $K_S$.

In block 632, the computing device 100 from within the unsealer secure enclave 214 decrypts the encrypted message with the seal key $K_S$ to recover the plaintext message. As described above in connection with block 614, the computing device 100 may use any appropriate cryptographic algorithm to decrypt the encrypted message. For example, the computing device 100 may use an authenticated encryption with associated data (AEAD) algorithm. After unsealing the message, the method 600 loops back to block 606 shown in FIG. 6A to continue sealing and unsealing messages.

Although in the illustrative embodiment the sealer secure enclave is the report generator enclave 206 and the unsealer secure enclave is the report target enclave 214, it should be understood that in some embodiments the sealer and unsealer roles may be swapped. For example, in some embodiments, the sealer secure enclave may execute the EGETKEY instruction to retrieve its own report key, construct a report structure, and then generate the seal key $K_S$ over the report using the report key. The unsealer secure enclave would then execute the EREPORT instruction to generate a report including a MAC that may be used as the seal key. In those embodiments, the sealed message is tied to the KEYID value included in the CR_REPORT_KEYID register, which is changed upon every reset of the processor 120. Thus, in those embodiments a sealed message may not be decrypted after a reset of the processor 120, even by the correct unsealer secure enclave.

Figure 7:
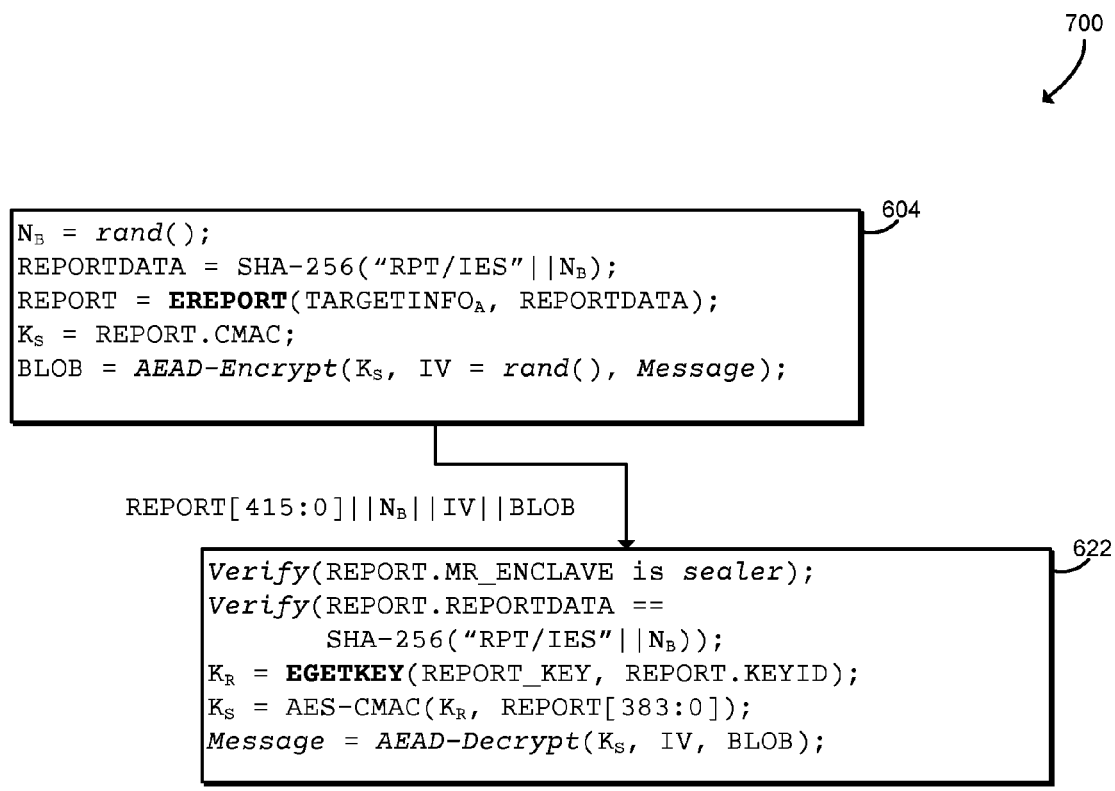
FIG. 7 is a pseudocode diagram illustrating at least one embodiment of the method of FIGS. 6A and 6B.

Referring now to FIG. 7, pseudocode diagram 700 illustrates one potential embodiment of the method 600 described above in connection with FIGS. 6A and 6B. As described above, the sealer secure enclave 206 executes the block grouping 604, which includes executing the EREPORT instruction. The parameter TARGETINFO$_A$ provided to the EREPORT instruction identifies the unsealer secure enclave 214. The sealer secure enclave 206 stores the report body (i.e., REPORT[415:0]), the nonce $N_B$, an initialization vector IV, and the encrypted message (i.e., BLOB). The value used for the initialization vector IV depends on the embodiment and may be, for example, a random number or a non-random number. In some embodiments the initialization vector IV may not be used. Those stored values may be accessed by the unsealer secure enclave 214. The unsealer secure enclave 214 executes the block grouping 622, which includes executing the EGETKEY instruction. After decryption, the unsealer secure enclave 214 may access the decrypted message.

It should be appreciated that, in some embodiments, the methods 300, 400, and/or 600 may be embodied as various instructions stored on a computer-readable media, which may be executed by the processor 120, the I/O subsystem 124, and/or other components of the computing device 100 to cause the computing device 100 to perform the respective method 300, 400, and/or 600. The computer-readable media may be embodied as any type of media capable of being read by the computing device 100 including, but not limited to, the memory 126, the data storage device 128, firmware devices, and/or other media.

EXAMPLES

Illustrative examples of the technologies disclosed herein are provided below. An embodiment of the technologies may include any one or more, and any combination of, the examples described below.

Example 1 includes a computing device for secure communication, the computing device comprising a processor having secure enclave support; a report generator module to (i) invoke, by a first secure enclave established with the secure enclave support of the processor, a first processor instruction to cause the processor to generate a report targeted to a second secure enclave, wherein the report includes a report body and a message authentication code, and wherein the message authentication code is generated as a function of the report body and a report key associated with the second secure enclave, and (ii) perform, by the first secure enclave, a cryptographic operation on a message with the message authentication code of the report as a cryptographic key; and a report target module to (i) invoke, by the second secure enclave established with the secure enclave support of the processor, a second processor instruction to cause the processor to generate the report key associated with the second secure enclave, (ii) generate, by the second secure enclave, the message authentication code over the report body with the report key, and (iii) perform, by the second secure enclave, a cryptographic operation on the message with the message authentication code of the report as the cryptographic key.

Example 2 includes the subject matter of Example 1, and wherein to invoke the first processor instruction further comprises to cause the processor to derive the report key as a function of a secret device key of the processor; and to invoke the second processor instruction further comprises to cause the processor to derive the report key as a function of the secret device key of the processor.

Example 3 includes the subject matter of any of Examples 1 and 2, and wherein the report target module is further to verify, by the second secure enclave, a measurement of the first secure enclave, wherein the report body includes the measurement; and to invoke the first processor instruction to cause the processor to generate the report targeted to the second secure enclave further causes the processor to include the measurement of the first secure enclave in the report body.

Example 4 includes the subject matter of any of Examples 1-3, and further comprising a secure initialization module to (i) initialize the first secure enclave with the secure enclave support of the processor and (ii) initialize the second secure enclave with the secure enclave support of the processor; wherein to invoke the first processor instruction comprises to invoke the first processor instruction in response to initialization of the first secure enclave; and wherein to invoke the second processor instruction comprises to invoke the second processor instruction in response to initialization of the second secure enclave.

Example 5 includes the subject matter of any of Examples 1-4, and wherein to perform, by the first secure enclave, the cryptographic operation on the message comprises to protect an interactive secure messaging session with the second secure enclave using the message authentication code of the report as the cryptographic key; and to perform, by the second secure enclave, the cryptographic operation on the message comprises to protect the interactive secure messaging session with the first secure enclave using the message authentication code of the report as the cryptographic key.

Example 6 includes the subject matter of any of Examples 1-5, and wherein to protect the interactive secure messaging session comprises to derive a session key as a function of the message authentication code of the report.

Example 7 includes the subject matter of any of Examples 1-6, and wherein the report target module is further to (i) generate, by the second secure enclave, a first random nonce and (ii) transmit the first nonce from the second secure enclave to the first secure enclave; the report generator module is further to (i) generate, by the first secure enclave, a second random nonce and (ii) generate, by the first secure enclave, report data as a function of the first random nonce, the second random nonce, and a domain separation constant; and to invoke the first processor instruction comprises to invoke the first processor instruction with the report data to cause the processor to generate the report, wherein the report body includes the report data.

Example 8 includes the subject matter of any of Examples 1-7, and wherein the report generator module is further to derive, by the first secure enclave, a message authentication code key as a function of the message authentication code of the report and a domain separation constant; generate, by the first secure enclave, a receiver message authentication code over the report data using the message authentication code key; and transmit the report body, the second random nonce, and the receiver message authentication code from the first secure enclave to the second secure enclave.

Example 9 includes the subject matter of any of Examples 1-8, and wherein the report target module is further to derive, by the second secure enclave, the message authentication code key as a function of the message authentication code of the report and the domain separation constant; and verify, by the second secure enclave, the receiver message authentication code with the report data and the message authentication code key.

Example 10 includes the subject matter of any of Examples 1-9, and wherein the report target module is further to (i) generate, by the second secure enclave, an initiator message authentication code over the second random nonce with the message authentication code key and (ii) transmit, by the second secure enclave, the initiator message authentication code to the first secure enclave; and the report generator module is further to verify, by the first secure enclave, the initiator message authentication code with the second random nonce and the message authentication code key.

Example 11 includes the subject matter of any of Examples 1-10, and wherein to perform, by the first secure enclave, the cryptographic operation on the message comprises to seal the message to generate an encrypted message with the message authentication code of the report as the cryptographic key; and to perform, by the second secure enclave, the cryptographic operation on the message comprises to unseal the encrypted message to recover the message with the message authentication code of the report as the cryptographic key.

Example 12 includes the subject matter of any of Examples 1-11, and wherein the report generator module is further to (i) generate, by the first secure enclave, a random nonce and (ii) generate, by the first secure enclave, report data as a function of the random nonce and a domain separation constant; wherein to invoke the first processor instruction comprises to invoke the first processor instruction with the report data to generate the report, wherein the report body includes the report data.

Example 13 includes the subject matter of any of Examples 1-12, and wherein the report generator module is further to store, by the first secure enclave, the report body, the random nonce, and the encrypted message.

Example 14 includes the subject matter of any of Examples 1-13, and wherein the report target module is further to verify, by the second secure enclave, the report data with the random nonce and the domain separation constant.

Example 15 includes the subject matter of any of Examples 1-14, and wherein to perform, by the second secure enclave, the cryptographic operation on the message comprises to seal the message to generate an encrypted message with the message authentication code of the report as the cryptographic key; and to perform, by the first secure enclave, the cryptographic operation on the message comprises to unseal the encrypted message to recover the message with the message authentication code of the report as the cryptographic key.

Example 16 includes a method for secure communication, the method comprising invoking, by a first secure enclave established using secure enclave support of a processor of a computing device, a first processor instruction to cause the processor to generate a report targeted to a second secure enclave, wherein the report includes a report body and a message authentication code, and wherein the message authentication code is generated as a function of the report body and a report key associated with the second secure enclave; performing, by the first secure enclave, a cryptographic operation on a message using the message authentication code of the report as a cryptographic key; invoking, by the second secure enclave established using the secure enclave support of the processor, a second processor instruction to cause the processor to generate the report key associated with the second secure enclave; generating, by the second secure enclave, the message authentication code over the report body using the report key; and performing, by the second secure enclave, a cryptographic operation on the message using the message authentication code of the report as the cryptographic key.

Example 17 includes the subject matter of Example 16, and wherein invoking the first processor instruction further comprises causing the processor to derive the report key as a function of a secret device key of the processor; and invoking the second processor instruction further comprises causing the processor to derive the report key as a function of the secret device key of the processor.

Example 18 includes the subject matter of any of Examples 16 and 17, and further comprising verifying, by the second secure enclave, a measurement of the first secure enclave, wherein the report body includes the measurement; wherein invoking the first processor instruction to cause the processor to generate the report targeted to the second secure enclave further causes the processor to include the measurement of the first secure enclave in the report body.

Example 19 includes the subject matter of any of Examples 16-18, and further comprising initializing, by the computing device, the first secure enclave using the secure enclave support of the processor; and initializing, by the computing device, the second secure enclave using the secure enclave support of the processor; wherein invoking the first processor instruction comprises invoking the first processor instruction in response to initializing the first secure enclave; and wherein invoking the second processor instruction comprises invoking the second processor instruction in response to initializing the second secure enclave.

Example 20 includes the subject matter of any of Examples 16-19, and wherein performing, by the first secure enclave, the cryptographic operation on the message comprises protecting an interactive secure messaging session with the second secure enclave using the message authentication code of the report as the cryptographic key; and performing, by the second secure enclave, the cryptographic operation on the message comprises protecting the interactive secure messaging session with the first secure enclave using the message authentication code of the report as the cryptographic key.

Example 21 includes the subject matter of any of Examples 16-20, and wherein protecting the interactive secure messaging session comprises deriving a session key as a function of the message authentication code of the report.

Example 22 includes the subject matter of any of Examples 16-21, and further comprising generating, by the second secure enclave, a first random nonce; transmitting the first nonce from the second secure enclave to the first secure enclave; generating, by the first secure enclave, a second random nonce; and generating, by the first secure enclave, report data as a function of the first random nonce, the second random nonce, and a domain separation constant; wherein invoking the first processor instruction comprises invoking the first processor instruction with the report data to cause the processor to generate the report, wherein the report body includes the report data.

Example 23 includes the subject matter of any of Examples 16-22, and further comprising deriving, by the first secure enclave, a message authentication code key as a function of the message authentication code of the report and a domain separation constant; generating, by the first secure enclave, a receiver message authentication code over the report data using the message authentication code key; and transmitting the report body, the second random nonce, and the receiver message authentication code from the first secure enclave to the second secure enclave.

Example 24 includes the subject matter of any of Examples 16-23, and further comprising deriving, by the second secure enclave, the message authentication code key as a function of the message authentication code of the report and the domain separation constant; and verifying, by the second secure enclave, the receiver message authentication code using the report data and the message authentication code key.

Example 25 includes the subject matter of any of Examples 16-24, and further comprising generating, by the second secure enclave, an initiator message authentication code over the second random nonce using the message authentication code key; transmitting, by the second secure enclave, the initiator message authentication code to the first secure enclave; and verifying, by the first secure enclave, the initiator message authentication code using the second random nonce and the message authentication code key.

Example 26 includes the subject matter of any of Examples 16-25, and wherein performing, by the first secure enclave, the cryptographic operation on the message comprises sealing the message to generate an encrypted message using the message authentication code of the report as the cryptographic key; and performing, by the second secure enclave, the cryptographic operation on the message comprises unsealing the encrypted message to recover the message using the message authentication code of the report as the cryptographic key.

Example 27 includes the subject matter of any of Examples 16-26, and further comprising generating, by the first secure enclave, a random nonce; and generating, by the first secure enclave, report data as a function of the random nonce and a domain separation constant; wherein invoking the first processor instruction comprises invoking the first processor instruction with the report data to generate the report, wherein the report body includes the report data.

Example 28 includes the subject matter of any of Examples 16-27, and further comprising storing, by the first secure enclave, the report body, the random nonce, and the encrypted message.

Example 29 includes the subject matter of any of Examples 16-28, and further comprising verifying, by the second secure enclave, the report data using the random nonce and the domain separation constant.

Example 30 includes the subject matter of any of Examples 16-29, and wherein performing, by the second secure enclave, the cryptographic operation on the message comprises sealing the message to generate an encrypted message using the message authentication code of the report as the cryptographic key; and performing, by the first secure enclave, the cryptographic operation on the message comprises unsealing the encrypted message to recover the message using the message authentication code of the report as the cryptographic key.

Example 31 includes a computing device comprising a processor; and a memory having stored therein a plurality of instructions that when executed by the processor cause the computing device to perform the method of any of Examples 16-30.

Example 32 includes one or more machine readable storage media comprising a plurality of instructions stored thereon that in response to being executed result in a computing device performing the method of any of Examples 16-30.

Example 33 includes a computing device comprising means for performing the method of any of Examples 16-30.

Example 34 includes a computing device for secure communication, the computing device comprising means for invoking, by a first secure enclave established using secure enclave support of a processor of the computing device, a first processor instruction to cause the processor to generate a report targeted to a second secure enclave, wherein the report includes a report body and a message authentication code, and wherein the message authentication code is generated as a function of the report body and a report key associated with the second secure enclave; means for performing, by the first secure enclave, a cryptographic operation on a message using the message authentication code of the report as a cryptographic key; means for invoking, by the second secure enclave established using the secure enclave support of the processor, a second processor instruction to cause the processor to generate the report key associated with the second secure enclave; means for generating, by the second secure enclave, the message authentication code over the report body using the report key; and means for performing, by the second secure enclave, a cryptographic operation on the message using the message authentication code of the report as the cryptographic key.

Example 35 includes the subject matter of Example 34, and wherein the means for invoking the first processor instruction further comprises means for causing the processor to derive the report key as a function of a secret device key of the processor; and the means for invoking the second processor instruction further comprises means for causing the processor to derive the report key as a function of the secret device key of the processor.

Example 36 includes the subject matter of any of Examples 34 and 35, and further comprising means for verifying, by the second secure enclave, a measurement of the first secure enclave, wherein the report body includes the measurement; wherein the means for invoking the first processor instruction to cause the processor to generate the report targeted to the second secure enclave further comprises means for causing the processor to include the measurement of the first secure enclave in the report body.

Example 37 includes the subject matter of any of Examples 34-36, and further comprising means for initializing the first secure enclave using the secure enclave support of the processor; and means for initializing the second secure enclave using the secure enclave support of the processor; wherein the means for invoking the first processor instruction comprises means for invoking the first processor instruction in response to initializing the first secure enclave; and wherein the means for invoking the second processor instruction comprises means for invoking the second processor instruction in response to initializing the second secure enclave.

Example 38 includes the subject matter of any of Examples 34-37, and wherein the means for performing, by the first secure enclave, the cryptographic operation on the message comprises means for protecting an interactive secure messaging session with the second secure enclave using the message authentication code of the report as the cryptographic key; and the means for performing, by the second secure enclave, the cryptographic operation on the message comprises means for protecting the interactive secure messaging session with the first secure enclave using the message authentication code of the report as the cryptographic key.

Example 39 includes the subject matter of any of Examples 34-38, and wherein the means for protecting the interactive secure messaging session comprises means for deriving a session key as a function of the message authentication code of the report.

Example 40 includes the subject matter of any of Examples 34-39, and further comprising means for generating, by the second secure enclave, a first random nonce; means for transmitting the first nonce from the second secure enclave to the first secure enclave; means for generating, by the first secure enclave, a second random nonce; and means for generating, by the first secure enclave, report data as a function of the first random nonce, the second random nonce, and a domain separation constant; wherein the means for invoking the first processor instruction comprises means for invoking the first processor instruction with the report data to cause the processor to generate the report, wherein the report body includes the report data.

Example 41 includes the subject matter of any of Examples 34-40, and further comprising means for deriving, by the first secure enclave, a message authentication code key as a function of the message authentication code of the report and a domain separation constant; means for generating, by the first secure enclave, a receiver message authentication code over the report data using the message authentication code key; and means for transmitting the report body, the second random nonce, and the receiver message authentication code from the first secure enclave to the second secure enclave.

Example 42 includes the subject matter of any of Examples 34-41, and further comprising means for deriving, by the second secure enclave, the message authentication code key as a function of the message authentication code of the report and the domain separation constant; and means for verifying, by the second secure enclave, the receiver message authentication code using the report data and the message authentication code key.

Example 43 includes the subject matter of any of Examples 34-42, and further comprising means for generating, by the second secure enclave, an initiator message authentication code over the second random nonce using the message authentication code key; means for transmitting, by the second secure enclave, the initiator message authentication code to the first secure enclave; and means for verifying, by the first secure enclave, the initiator message authentication code using the second random nonce and the message authentication code key.

Example 44 includes the subject matter of any of Examples 34-43, and wherein the means for performing, by the first secure enclave, the cryptographic operation on the message comprises means for sealing the message to generate an encrypted message using the message authentication code of the report as the cryptographic key; and the means for performing, by the second secure enclave, the cryptographic operation on the message comprises means for unsealing the encrypted message to recover the message using the message authentication code of the report as the cryptographic key.

Example 45 includes the subject matter of any of Examples 34-44, and further comprising means for generating, by the first secure enclave, a random nonce; and means for generating, by the first secure enclave, report data as a function of the random nonce and a domain separation constant; wherein the means for invoking the first processor instruction comprises means for invoking the first processor instruction with the report data to generate the report, wherein the report body includes the report data.

Example 46 includes the subject matter of any of Examples 34-45, and further comprising means for storing, by the first secure enclave, the report body, the random nonce, and the encrypted message.

Example 47 includes the subject matter of any of Examples 34-46, and further comprising means for verifying, by the second secure enclave, the report data using the random nonce and the domain separation constant.

Example 48 includes the subject matter of any of Examples 34-47, and wherein the means for performing, by the second secure enclave, the cryptographic operation on the message comprises means for sealing the message to generate an encrypted message using the message authentication code of the report as the cryptographic key; and the means for performing, by the first secure enclave, the cryptographic operation on the message comprises means for unsealing the encrypted message to recover the message using the message authentication code of the report as the cryptographic key.

The invention claimed is:

1. A computing device for secure communication, the computing device comprising:
   a processor having secure enclave support;
   a report generator module to (i) invoke, by a first secure enclave established with the secure enclave support of the processor, a first processor instruction to cause the processor to generate a report targeted to a second secure enclave, wherein the report includes a report body and a message authentication code, and wherein the message authentication code is generated as a function of the report body and a report key associated with the second secure enclave, and (ii) perform, by the first secure enclave, a cryptographic operation on a message with the message authentication code of the report as a cryptographic key; and a report target module to (i) invoke, by the second secure enclave established with the secure enclave support of the processor, a second processor instruction to cause the processor to generate the report key associated with the second secure enclave, (ii) generate, by the second secure enclave, the message authentication code over the report body with the report key, and (iii) perform, by the second secure enclave, a cryptographic operation on the message with the message authentication code of the report as the cryptographic key.

2. The computing device of claim 1, wherein:
to invoke the first processor instruction further comprises to cause the processor to derive the report key as a function of a secret device key of the processor; and
to invoke the second processor instruction further comprises to cause the processor to derive the report key as a function of the secret device key of the processor.

3. The computing device of claim 1, wherein:
the report target module is further to verify, by the second secure enclave, a measurement of the first secure enclave, wherein the report body includes the measurement; and
to invoke the first processor instruction to cause the processor to generate the report targeted to the second secure enclave further causes the processor to include the measurement of the first secure enclave in the report body.

4. The computing device of claim 1, further comprising:
a secure initialization module to (i) initialize the first secure enclave with the secure enclave support of the processor and (ii) initialize the second secure enclave with the secure enclave support of the processor;
wherein to invoke the first processor instruction comprises to invoke the first processor instruction in response to initialization of the first secure enclave; and
wherein to invoke the second processor instruction comprises to invoke the second processor instruction in response to initialization of the second secure enclave.

5. The computing device of claim 1, wherein:
to perform, by the first secure enclave, the cryptographic operation on the message comprises to protect an interactive secure messaging session with the second secure enclave using the message authentication code of the report as the cryptographic key; and
to perform, by the second secure enclave, the cryptographic operation on the message comprises to protect the interactive secure messaging session with the first secure enclave using the message authentication code of the report as the cryptographic key.

6. The computing device of claim 5, wherein to protect the interactive secure messaging session comprises to derive a session key as a function of the message authentication code of the report.

7. The computing device of claim 5, wherein:
the report target module is further to (i) generate, by the second secure enclave, a first random nonce and (ii) transmit the first nonce from the second secure enclave to the first secure enclave;

the report generator module is further to (i) generate, by the first secure enclave, a second random nonce and (ii) generate, by the first secure enclave, report data as a function of the first random nonce, the second random nonce, and a domain separation constant; and
to invoke the first processor instruction comprises to invoke the first processor instruction with the report data to cause the processor to generate the report, wherein the report body includes the report data.

8. The computing device of claim 1, wherein:
to perform, by the first secure enclave, the cryptographic operation on the message comprises to seal the message to generate an encrypted message with the message authentication code of the report as the cryptographic key; and
to perform, by the second secure enclave, the cryptographic operation on the message comprises to unseal the encrypted message to recover the message with the message authentication code of the report as the cryptographic key.

9. The computing device of claim 8, wherein:
the report generator module is further to (i) generate, by the first secure enclave, a random nonce and (ii) generate, by the first secure enclave, report data as a function of the random nonce and a domain separation constant;
wherein to invoke the first processor instruction comprises to invoke the first processor instruction with the report data to generate the report, wherein the report body includes the report data.

10. The computing device of claim 9, wherein the report generator module is further to store, by the first secure enclave, the report body, the random nonce, and the encrypted message.

11. The computing device of claim 1, wherein:
to perform, by the second secure enclave, the cryptographic operation on the message comprises to seal the message to generate an encrypted message with the message authentication code of the report as the cryptographic key; and
to perform, by the first secure enclave, the cryptographic operation on the message comprises to unseal the encrypted message to recover the message with the message authentication code of the report as the cryptographic key.

12. A method for secure communication, the method comprising:
invoking, by a first secure enclave established using secure enclave support of a processor of a computing device, a first processor instruction to cause the processor to generate a report targeted to a second secure enclave, wherein the report includes a report body and a message authentication code, and wherein the message authentication code is generated as a function of the report body and a report key associated with the second secure enclave;
performing, by the first secure enclave, a cryptographic operation on a message using the message authentication code of the report as a cryptographic key;
invoking, by the second secure enclave established using the secure enclave support of the processor, a second processor instruction to cause the processor to generate the report key associated with the second secure enclave;
generating, by the second secure enclave, the message authentication code over the report body using the report key; and performing, by the second secure enclave, a cryptographic operation on the message using the message authentication code of the report as the cryptographic key.

13. The method of claim 12, wherein:
invoking the first processor instruction further comprises causing the processor to derive the report key as a function of a secret device key of the processor; and
invoking the second processor instruction further comprises causing the processor to derive the report key as a function of the secret device key of the processor.

14. The method of claim 12, wherein:
performing, by the first secure enclave, the cryptographic operation on the message comprises protecting an interactive secure messaging session with the second secure enclave using the message authentication code of the report as the cryptographic key; and
performing, by the second secure enclave, the cryptographic operation on the message comprises protecting the interactive secure messaging session with the first secure enclave using the message authentication code of the report as the cryptographic key.

15. The method of claim 14, wherein protecting the interactive secure messaging session comprises deriving a session key as a function of the message authentication code of the report.

16. The method of claim 12, wherein:
performing, by the first secure enclave, the cryptographic operation on the message comprises sealing the message to generate an encrypted message using the message authentication code of the report as the cryptographic key; and
performing, by the second secure enclave, the cryptographic operation on the message comprises unsealing the encrypted message to recover the message using the message authentication code of the report as the cryptographic key.

17. The method of claim 12, wherein:
performing, by the second secure enclave, the cryptographic operation on the message comprises sealing the message to generate an encrypted message using the message authentication code of the report as the cryptographic key; and
performing, by the first secure enclave, the cryptographic operation on the message comprises unsealing the encrypted message to recover the message using the message authentication code of the report as the cryptographic key.

18. One or more computer-readable storage media comprising a plurality of instructions that in response to being executed cause a computing device to:
invoke, by a first secure enclave established using secure enclave support of a processor of the computing device, a first processor instruction to cause the processor to generate a report targeted to a second secure enclave, wherein the report includes a report body and a message authentication code, and wherein the message authentication code is generated as a function of the report body and a report key associated with the second secure enclave;
perform, by the first secure enclave, a cryptographic operation on a message using the message authentication code of the report as a cryptographic key;
invoke, by the second secure enclave established using the secure enclave support of the processor, a second processor instruction to cause the processor to generate the report key associated with the second secure enclave;
generate, by the second secure enclave, the message authentication code over the report body using the report key; and
perform, by the second secure enclave, a cryptographic operation on the message using the message authentication code of the report as the cryptographic key.

19. The one or more computer-readable storage media of claim 18, wherein:
to invoke the first processor instruction further comprises to cause the processor to derive the report key as a function of a secret device key of the processor; and
to invoke the second processor instruction further comprises to cause the processor to derive the report key as a function of the secret device key of the processor.

20. The one or more computer-readable storage media of claim 18, wherein:
to perform, by the first secure enclave, the cryptographic operation on the message comprises to protect an interactive secure messaging session with the second secure enclave using the message authentication code of the report as the cryptographic key; and
to perform, by the second secure enclave, the cryptographic operation on the message comprises to protect the interactive secure messaging session with the first secure enclave using the message authentication code of the report as the cryptographic key.

21. The one or more computer-readable storage media of claim 20, wherein to protect the interactive secure messaging session comprises to derive a session key as a function of the message authentication code of the report.

22. The one or more computer-readable storage media of claim 18, wherein:
to perform, by the first secure enclave, the cryptographic operation on the message comprises to seal the message to generate an encrypted message using the message authentication code of the report as the cryptographic key; and
to perform, by the second secure enclave, the cryptographic operation on the message comprises to unseal the encrypted message to recover the message using the message authentication code of the report as the cryptographic key.

23. The one or more computer-readable storage media of claim 18, wherein:
to perform, by the second secure enclave, the cryptographic operation on the message comprises to seal the message to generate an encrypted message using the message authentication code of the report as the cryptographic key; and
to perform, by the first secure enclave, the cryptographic operation on the message comprises to unseal the encrypted message to recover the message using the message authentication code of the report as the cryptographic key.

* * * * *